United States Patent
Arlt

(10) Patent No.: US 6,380,509 B1
(45) Date of Patent: Apr. 30, 2002

(54) METHOD AND DEVICE FOR THE MANUFACTURE OF CONNECTION ENDS ON METAL HOSES

(75) Inventor: Alfred Gerhard Arlt, Schwalbach (DE)

(73) Assignee: IWKA Balg- und KompensatorenTechnologie GmbH, Stutensee (DE)

( * ) Notice: Subject to any disclaimer, the term of this patent is extended or adjusted under 35 U.S.C. 154(b) by 0 days.

(21) Appl. No.: 09/433,575

(22) Filed: Nov. 4, 1999

(30) Foreign Application Priority Data

Nov. 6, 1998 (DE) .......................................... 198 51 173

(51) Int. Cl.⁷ ............................................... B23K 26/00
(52) U.S. Cl. ............................ 219/121.63; 219/121.78; 219/121.67
(58) Field of Search ........................... 219/121.63, 105, 219/107, 121.78, 121.67, 121.79; 228/153, 154, 170

(56) References Cited

U.S. PATENT DOCUMENTS

| | | | | |
|---|---|---|---|---|
| 4,694,137 A | * | 9/1987 | Hawkins et al. | 219/121 LC |
| 5,986,236 A | * | 11/1999 | Gainand et al. | 219/121.82 |
| 6,060,682 A | * | 5/2000 | Westbroek et al. | 219/121.64 |

FOREIGN PATENT DOCUMENTS

DE        44 11 246        10/1995

* cited by examiner

*Primary Examiner*—M. Alexandra Elve
(74) *Attorney, Agent, or Firm*—Paul Vincent

(57) ABSTRACT

The invention provides improved and simplified production of connection ends on metal strip wound hose pieces which are separated from endless strip wound hose, by continuously guiding a laser beam about the entire periphery of the strip wound hose member to produce a welding seam, the laser beam modulated with a motion which is cyclic and parallel to the axis of the strip wound hose piece, to produce, in particular, a sinusoidal or triangular-shaped continuous welding seam.

12 Claims, 2 Drawing Sheets

METHOD AND DEVICE FOR THE MANUFACTURE OF CONNECTION ENDS ON METAL HOSES

This applicant claims Paris Convention priority of DE 198 51 173.6 filed Nov. 6, 1998 the complete disclosure of which is hereby incorporated by reference.

BACKGROUND OF THE INVENTION

The invention concerns a method for producing connection ends on metal hoses which are separated off endless hoses, wherein overlapping metal layers are fixed by means of laser welding prior to separation, as well as a device for the manufacture of connection ends on metal hose pieces which are separated off endless hose, wherein overlapping metal layers are fixed by means of welding prior to separation.

The above mentioned types of metal hose are manufactured by helically winding one or a plurality of layers of metal band. The positive interlocking connection between neighboring band regions and/or layers is effected by V-shaped profiling or folding. The assembly and production lines for hoses of this type produce endless hose or hose sections having a length of several meters.

For subsequent applications, it is necessary to cut the strip wound hose to a certain length appropriate for the application at hand. This separation procedure cannot be carried out through simple perpendicular cutting, since the anchoring between neighboring layers would be partially removed thereby and the ends of the band would spring apart due to the intrinsic tension therein to produce sharp points or wedge-shaped inclusions on the ends of the bands. Hoses having such sprung ends cannot be processed further. For this reason, the ends are fixed prior to separation of the hose piece from the endless hose. This can be effected by means of stamping, pressing or the like, requiring complicated and expensive tools which, in addition, have to be adapted to the hose geometry at hand.

For this reason, one has already proposed the introduction of a large number of welding locations in the form of a stitch seam effected by beam welding to fix the winding layers in the vicinity of the hose ends which are to be produced and to separate using laser welding (DE 44 11 246 A1). Disadvantageously, this procedure leads, in particular, to extensive spatter formation during spot welding of heavily oiled or coated metal bands leading to soiling of the processing optics and gas leads. Also disadvantageous is that either two stitch seams must be produced next to each other or one stitch seam having large spot diameter This latter procedure substantially reduces the processing speed. In addition, the finite separation between welding points can lead to the formation of small tips or pimples following separation Departing therefrom, it is the underlying purpose of the invention to introduce a method for the production of connection ends of strip wound hose which is flexible as well as economical and to introduce an associated device for carrying out such a method.

SUMMARY OF THE INVENTION

This purpose is achieved in accordance with the invention using a method of the above mentioned kind, wherein a laser beam is guided continuously over the entire periphery of the hose piece for production of the welding seam, the laser beam modulated with a cyclic motion through a finite angle with respect to the peripheral direction of the hose piece. The purpose underlying the invention is also solved by a device categorizing the invention having a periodically functioning deflection device for deflecting the laser beam through a finite angle with respect to the peripheral direction of the metal hose.

In principle, the above mentioned sweeping motion can subtend a finite angle with respect to the axis of the hose piece, in particular, in a range between minus 60° to plus 60° relative to the hose axis. This provides an additional degree of freedom for configuring the geometry of the tacking seam. However, a preferred embodiment provides that the sweeping motion be exercised parallel to the axis of the hose piece. This permits, in particular, sinusoidal or triangular-shaped (zigzag) seams which are normally and preferentially effected as a single seam. It is thereby no longer necessary to create a double seam. Although the sinusoidal or triangular shape of the individual seam leads to a seam length in excess of that of a peripheral seam lying in a plane perpendicular to the axis and therefore Lo longer associated production times, these production times are nevertheless significantly less than the time required to produce two parallel seams with the same specific power introduced into the welding region or to produce a seam having larger spot diameter.

Moreover, the method in accordance with the invention has the substantial advantage that an interlocking material connection is effected directly up to the cutting plane, normally lying in the points of inflection of the welding seam. Typical amplitudes are in the range between 0.5–2 mm and preferentially between 0.5–0.7 mm. Control of the laser power and/or of the laser power density within the welding path can change the path energy to minimize the heat deposition for adaptation to the respective tubing geometries and/or to change the depth of the weld.

The separation of a hose end of an endless hose having a welding seam provided in the above mentioned manner can be preferentially effected using laser beam cutting, wherein a preferred embodiment provides that the separation of the hose ends from endless hose is effected directly following welding in the same processing step. In another preferred embodiment, the separation of the hose pieces is first effected after complete production of the welding seam about the entire periphery of the endless hose, wherein the separation is then preferably carried out with the same laser which produced the welding seam.

Additional preferred embodiments of the method provide that the cyclic motion of the laser beam in the axial direction of the hose piece for producing the peripheral laser welding seam is effected with a substantially higher frequency than the frequency of revolution of the endless hose and, in particular, that the cyclic motion has a frequency on the order of 150–250 Hz.

The deflection device for the laser beam preferentially comprises a deflection mirror which is adapted for steering.

Additional advantages and features of the invention can be derived from the claims and the following description in which embodiments of the method in accordance with the invention are shown and discussed in greater detail with reference to the drawing.

DESCRIPTION OF THE PREFERRED EMBODIMENT

Figure 1:
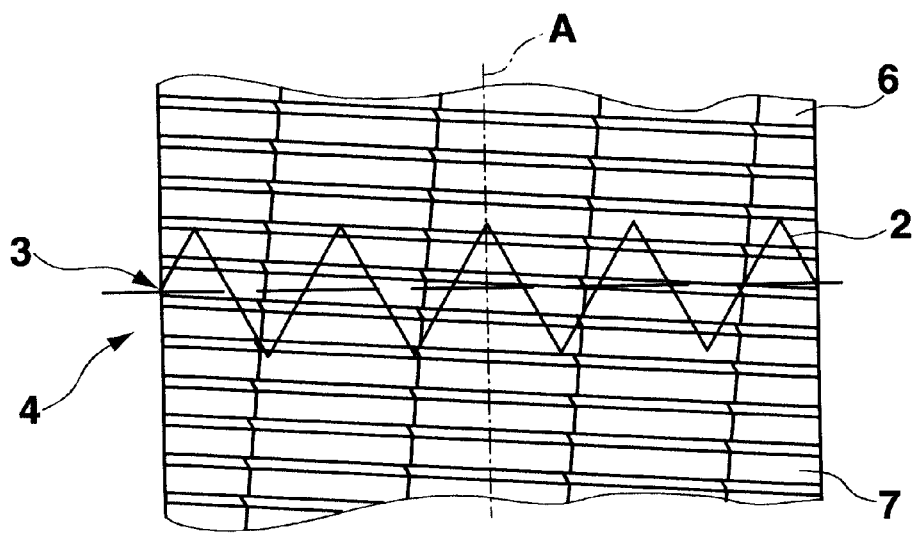
FIG. 1 shows a section of strip wound hose prior to separation having a zigzag or triangular-shaped welding seam.
Figure 2:
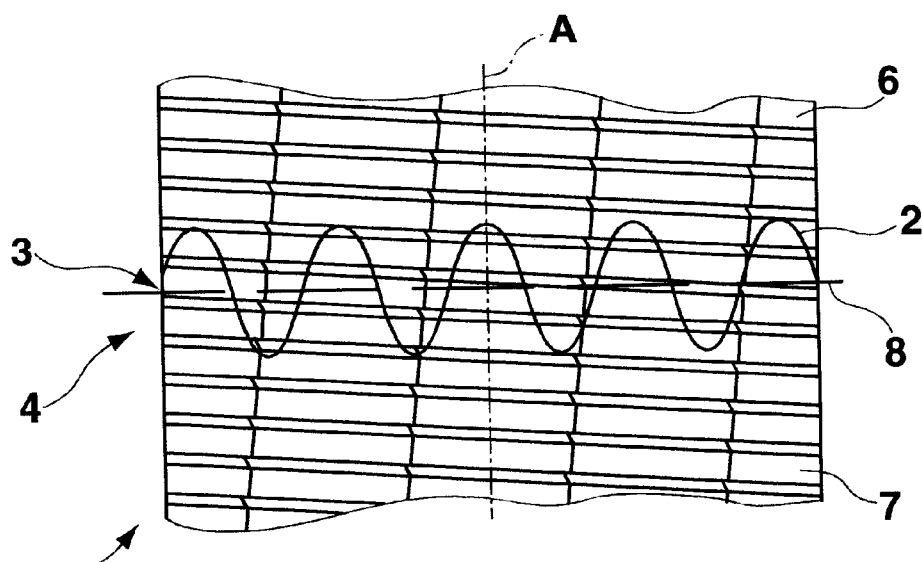
FIG. 2 shows a section of strip wound hose having a sinusoidal welding seam.

In accordance with the invention as shown in FIGS. 1 and 2, a sinusoidal or zigzag welding seam is produced over the entire periphery of a strip wound hose 1 (for example, an Agraff hose) by modulating the relative motion of a laser beam about the periphery of the strip wound hose 1 with a periodic motion parallel to the axis A of the strip wound hose 1 at a modulation frequency which is higher than the rotation frequency. The relative rotation between the laser and the hose is of importance. From a practical point of view, the strip wound hose is rotated and the laser beam is steered back and forth in the direction of the rotation axis only. In this fashion, the zigzag or triangular-shaped welding seam 2 shown in FIG. 1 is produced around the periphery of the strip wound hose 1. The amplitude of the cyclic motion in the direction of axis A is preferentially in the sub-millimeter range (that is to say <1 mm) and, in particular, in a range of approximately 0.5–0.7 mm, wherein the weldment band width can lie in a range between 0.25–0.5 mm. In this manner, the layers of the strip wound hose 1 in the vicinity of the ends 3, 4 of the hose pieces 6, 7 produced following separation are connected to each other and fixed in place. A separation of the hose pieces 6, 7 which are to be produced can be effected along the separation plane A, approximately in the middle of the sinusoidal or zigzag seam 21 wherein the separation plane A is preferentially perpendicular to axis A. In a preferred embodiment, the width of the cut assumes values of approximately 0.25 mm FIG. 2 shows a sinusoidal welding seam 2 on a strip wound hose 1 produced in the manner described above, The modulating motion of the laser beam is produced by a device for periodic deflection of the laser beam. Such a device could be a so-called freely programmable optical scanner device having movable mirrors, by means of which the laser beam can be sidewardly deflected back and forth, i.e. perpendicular to its principal direction of motion and parallel to the direction of axis A of the strip wound hose 7.

The procedure in accordance with the invention guarantees that the hose pieces 6, 7 have neither sprung band ends at the separation line following separation of the two hose pieces 6, 7 nor points, in particular, if the above described geometric conditions are maintained.

The production of the separation seam 8 can be effected in a second processing step using the same laser by once more guiding the laser about the strip wound hose (or by turning same relative to the laser) after production of the welding seam. Separation is effected with higher power and optionally higher focusing using a high pressure, inert gas module having nitrogen as the working gas Alternatively, a cutting laser can be introduced directly behind the laser used to produce the welding seam 2, so that a separation of the strip wound hose 2 into the pieces 3 and 4 can be effected practically in the same processing step and directly following production of the welding seam.

Preferentially, the welding and cutting speeds (pure peripheral speed) can be of an order of magnitude between 6–7 m/min, wherein cycle times for welding or cutting strip wound hoses of conventional diameters are somewhat longer that about 1 sec.

The welding process effected in the separation region leads to practically perfectly even cuts for the hose pieces produced in accordance with the invention, which do not require any post-processing.

Figure 3:
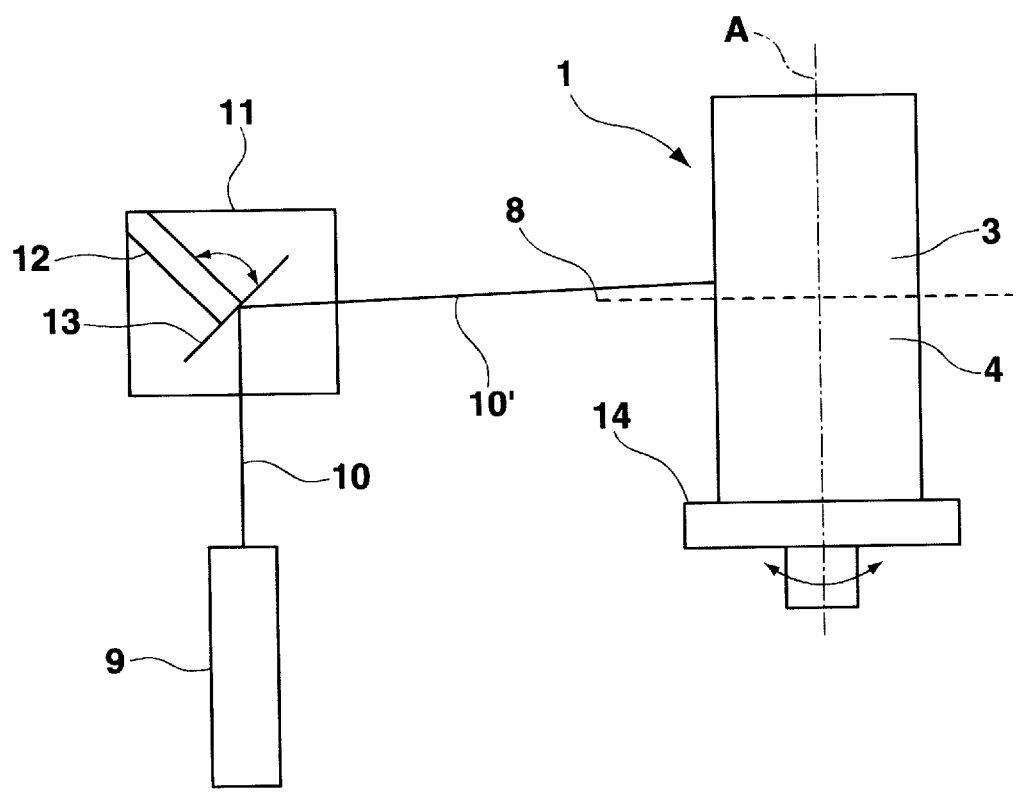
FIG. 3 shows a schematic representation of the deflection device for modulating the laser beam.

As can be seen in FIG. 3, the laser 9 emits a laser beam 10 which is incident on the deflection device 11. The deflection device 11 comprises a mirror 13 mounted for pivoting on a pivot support 12 to deflect the laser beam 10' up and down through a finite angle, as is schematically indicated by the double arrow. The deflected beam 10' is incident on the strap wound hose 1 and sweeps through a path substantially parallel to axis A of the hose 1 to pass back and forth through separation seam region 8 and between hose end sections 3 and 4. Means 14 are provided for rotating the hose 1 relative to the laser beam 10 to sweep the beam about the girth of the hose 1.

LIST OF REFERENCE SYMBOLS

1=strip wound hose
2=welded seam
3, 4=ends produced following separation
6, 7=hose pieces
8=separation seam
9=laser
10=emitted laser beam
10'=reflected laser beam
11=deflection device
12=pivot support
12=mirror
14=hose rotation device

I claim:

1. A method for using a laser beam to produce connection ends on pieces of strip wound hose which are separated off endless hose, the endless hose comprising overlapping metal layers, the method comprising the steps of:
   a) guiding the laser beam continuously over an entire periphery of the endless strip wound hose in a peripheral direction thereof; and
   b) steering the laser beam back and forth in a direction substantially transverse to said peripheral direction to exercise a cyclic motion through a finite angle relative to said peripheral direction for producing a waved welding seam to fix the overlapping metal layers prior to separation.

2. The method of claim 1, wherein a sinusoidal welding seam is produced.

3. The method of claim 1, wherein one of a zigzag and a triangular-shaped welding seam is produced.

4. The method of claim 1, further comprising the step of separating a piece of strip wound hose using laser beam cutting.

5. The method of claim 1, further comprising the seperating a piece of strip wound hose in a same processing step as steps a) and b), directly following welding of said seam.

6. The method of claim 1, further comprising the step of separating a strip wound hose piece after complete production of said welding seam over said entire periphery of the endless strip wound hose in steps a) and b).

7. The method of claim 6, wherein said seperating step is effected with a same laser used to produce said welding seam.

8. The method of claim 1, wherein said cyclic motion of the laser beam in step b) is exercised at a frequency which is substantially higher than a guiding frequency of the laser beam over the endless strip wound hose in step a).

9. The method of claim 8, wherein said the cyclic motion frequency is between about 150 and about 250 Hz.

10. The method of claim 1, wherein step b) effects a laser beam swath having a transverse extent between 1 and 2 mm on said endless strip wound hose.

11. A device for using a laser beam to produce connection ends on pieces of strip wound hose which are separated off endless strip wound hose, the endless strip wound hose comprising overlapping metal layers, the device comprising:
- a laser producing a laser beam;
- means for guiding the laser beam continuously over an entire periphery of the endless strip wound hose in a peripheral direction thereof; and
- means for steering the laser beam back and forth in a direction substantially transverse to said peripheral direction to exercise a cyclic motion through a finite angle relative to said peripheral direction for producing a waved welding seam to fix the overlapping metal layers prior to separation.

12. The device of claim 11, wherein said steering means comprise a deflecting mirror mounted for pivoting.

* * * * *